(12) United States Patent
Isozaki et al.

(10) Patent No.: US 7,574,602 B2
(45) Date of Patent: Aug. 11, 2009

(54) INFORMATION-PROCESSING DEVICE, INFORMATION-PROCESSING METHOD, AND INFORMATION-PROCESSING PROGRAM PRODUCT

(75) Inventors: Hiroshi Isozaki, Kawasaki (JP); Takeshi Saito, Meguro-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 892 days.

(21) Appl. No.: 11/034,845

(22) Filed: Jan. 14, 2005

(65) Prior Publication Data

US 2006/0005259 A1 Jan. 5, 2006

(30) Foreign Application Priority Data

Jun. 30, 2004 (JP) .............................. 2004-193898

(51) Int. Cl.
*H04L 9/32* (2006.01)
*H04L 9/00* (2006.01)

(52) U.S. Cl. ........................................ 713/168; 726/26
(58) Field of Classification Search ................. 713/168; 726/26

See application file for complete search history.

(56) References Cited

U.S. PATENT DOCUMENTS

| 5,892,900 | A | * | 4/1999 | Ginter et al. | ................... | 726/26 |
| 6,253,326 | B1 | * | 6/2001 | Lincke et al. | .................. | 726/12 |
| 2002/0157002 | A1 | * | 10/2002 | Messerges et al. | .......... | 713/155 |
| 2003/0198349 | A1 | | 10/2003 | Aizu et al. | | |
| 2004/0053622 | A1 | | 3/2004 | Nakakita et al. | | |

OTHER PUBLICATIONS

U.S. Appl. No. 10/599,958, filed Oct. 16, 2006, Saito, et al.
U.S. Appl. No. 11/071,252, filed Mar. 4, 2005, Isozaki et al.
U.S. Appl. No. 11/130,135, filed May 17, 2005, Isozaki et al.
U.S. Appl. No. 10/984,989, filed Nov. 10, 2004, Hiroshi Isozaki, et al.
U.S. Appl. No. 10/722,515, filed Nov. 28, 2003, Takeshi Saito, et al.
U.S. Appl. No. 10/876,705, filed Jun. 28, 2004, Takeshi Saito, et al.
U.S. Appl. No. 11/019,349, filed Dec. 23, 2004, Tatsuyuki Matsushita, et al.

* cited by examiner

*Primary Examiner*—Kambiz Zand
*Assistant Examiner*—William S Powers
(74) *Attorney, Agent, or Firm*—Oblon, Spivak, McClelland, Maier & Neustadt, P.C.

(57) ABSTRACT

An information-processing device includes a first interface configured to transmit content through a network to a first communication unit having a first unique identification, a second interface configured to receive a second unique identification allocated to a second communication unit, a first storage area configured to store the second unique identification through the second interface, a first judgment unit configured to determine whether the first unique identification received through the first interface is stored in the first storage area, a content supply unit configured to transmit the content to the first communication unit via the first interface when the first judgment unit determines that the first unique identification is stored in the first storage area, a second storage area configured to store a third unique identification allocated to a third communication unit during the content supply unit transmits the content and a management unit configured to delete all unique identifications from the first storage area and shift the third unique identification from the second storage area to the first storage area when the content supply unit has transmitted the content to the first communication unit completely.

13 Claims, 8 Drawing Sheets

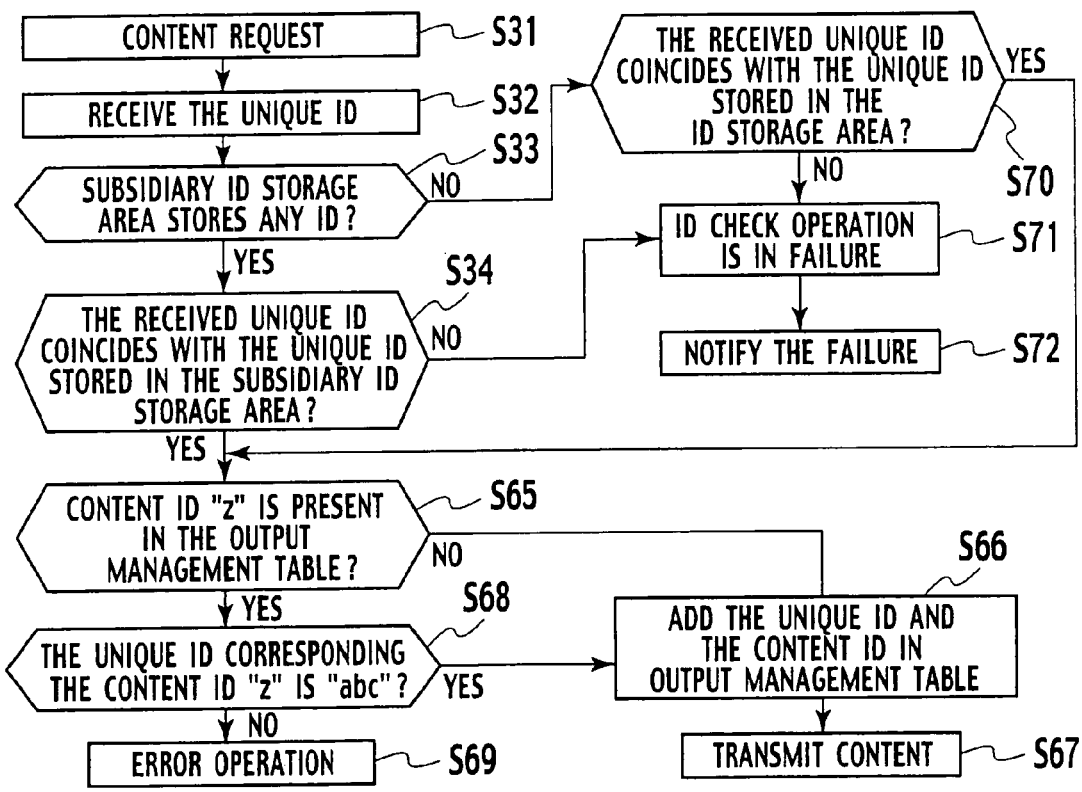
FIG. 16
FIG. 17
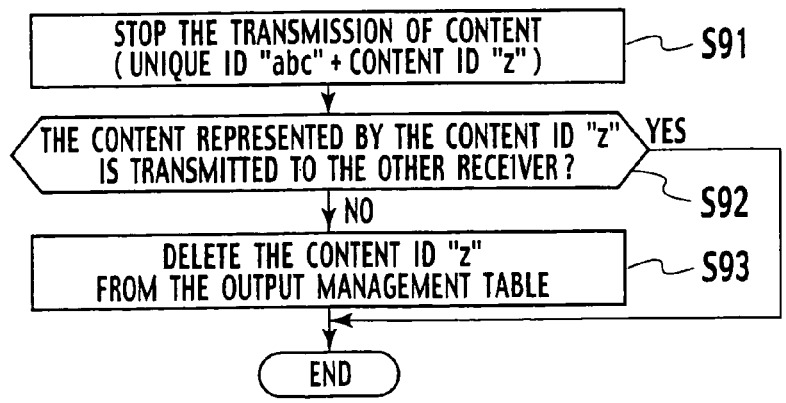
FIG. 18

INFORMATION-PROCESSING DEVICE, INFORMATION-PROCESSING METHOD, AND INFORMATION-PROCESSING PROGRAM PRODUCT

CROSS REFERENCE TO RELATED APPLICATIONS

This application is based upon and claims the benefit of priority from prior Japanese Patent Application P2004-193898 filed on Jun. 30, 2004; the entire contents of which are incorporated by reference herein.

BACKGROUND OF THE INVENTION

1. Field of the Invention

The present invention relates to an information-processing device, an information-processing method, and an information-processing program that transmits a variety of content needed to achieve copyright protection.

2. Description of the Related Art

With dissemination and digitalization of computer network in recent years, products, called as digital information electric appliances, are widely spread in use. Further, with start of ground wave digital broadcasting service, digital broadcasting-compliant televisions, STB (Set Top Box) and DVD recorders are predicted to become further widespread in the future. If these digital electric appliances are connected over a network, users are available to enjoy a variety of content via the home network with a resultant increase in utility value.

As used herein, the term "content" refers to various digital data, involving moving image data, such as MPEG2 and MPEG4, and audio data, and in addition to these, document data such as text data and still image data. Content composed of this kind of digital data is advantageous in that it can be easily copied without deteriorations, and then again, attention needs to be paid for copyright of content. For instance, in the case where content to be protected under copyright is transmitted from a certain transmitter to a receiver, an area available for exchanging content, whose copyright is to be protected, is limited to a certain range, for instance, an area under an legitimate authority such as an area for private use defined under the Copyright Act or a further narrowed area. It is preferable for content to be restricted from exchanging with a third party in an area beyond such a limited range.

However, in the event of transmitting AV data on IP (Internet Protocol), IP has a capability of transmitting data without any physical restrictions in a cable length. Therefore, issues easily occur on a copyright law. That is, in IP, technology, a so-called VPN (Virtual Private Network) in which IP networks can be logically connected to one another in remote areas, becomes widely used. By such technology, for example, it enables to logically connect equipment in a home network of Mr. X's residence in a district A with equipment in another home network of Mr. Y' residence in another district B (physically remote from the district A) for transmitting AV data. For this reason, content in the Mr. X's residence is not closed within the home network of Mr. X's residence. Then, Mr. Y in a remote place can browse content on the network owned by Mr. X by connecting the Mr. Y's home network to Mr. X's home network.

SUMMARY OF THE INVENTION

According to the present invention, in the middle of transmitting content to a first communication unit, unique information of the other communication unit is enabled to be stored, resulting in a capability of transmitting content to a plurality of communication units at the same time while achieving copyright protection for content, and this enables content to be effectively utilized with resultant improvement in convenience for users.

An aspect of the present invention inheres in an information-processing device including a first interface configured to transmit content through a network to a first communication unit having a first unique identification, a second interface configured to receive a second unique identification allocated to a second communication unit, a first storage area configured to store the second unique identification through the second interface, a first judgment unit configured to determine whether the first unique identification received through the first interface is stored in the first storage area, a content supply unit configured to transmit the content to the first communication unit via the first interface when the first judgment unit determines that the first unique identification is stored in the first storage area, a second storage area configured to store a third unique identification allocated to a third communication unit during the content supply unit transmits the content and a management unit configured to delete all unique identifications from the first storage area and shift the third unique identification from the second storage area to the first storage area when the content supply unit has transmitted the content to the first communication unit completely.

Another aspect of the present invention inheres in an information-processing method including transmitting content through a network from a first interface to a first communication unit having a first unique identification, receiving a second unique identification from a second communication unit through a second interface, the second unique identification is allocated to a second communication unit, storing the second unique identification in a first storage area through the second interface, determining whether the first unique identification received through the first interface is stored in the first storage area, transmitting the content to the first communication unit via the first interface when the first unique identification is stored in the first storage area, storing a third unique identification in a second storage area during the content is transmitted, the third unique identification is allocated to a third communication unit, deleting all unique identifications from the first storage area when the content has been transmitted to the first communication unit completely; and shifting the third unique identification from the second storage area to the first storage area.

Still another aspect of the present invention inheres in an information-processing program product including instructions for transmitting content through a network from a first interface to a first communication unit having a first unique identification, instructions for receiving a second unique identification from a second communication unit through a second interface, the second unique identification is allocated to a second communication unit, instructions for storing the second unique identification in a first storage area through the second interface, instructions for determining whether the first unique identification received through the first interface is stored in the first storage area, instructions for transmitting the content to the first communication unit via the first interface when the first unique identification is stored in the first storage area, instructions for storing a third unique identification in a second storage area during the content is transmitted, the third unique identification is allocated to a third communication unit, instructions for deleting all unique identifications from the first storage area when the content has been transmitted to the first communication unit completely and instructions for shifting the third unique identification from the second storage area to the first storage area.

BRIEF DESCRIPTION OF THE DRAWINGS

FIG. 13 is a flowchart illustrating one example of an operation sequence of the transmitter that determines whether to transmit content depending on the number of units of the receivers registered in an ID storage area 28a.

FIG. 16 is a table illustrating one example of content output management table of transmitter F to determine whether to transmit content.

FIG. 17 is a flowchart illustrating one example of an operation sequence of the transmitter F upon receipt of content request.

FIG. 18 is a flowchart illustrating one example of an operation sequence to be executed when the transmitter F interrupts the transmission of content.

DETAILED DESCRIPTION OF EMBODIMENTS

Hereinafter, one embodiment according to the present invention is described with reference to the accompanying drawings.

First Embodiment

A first embodiment contemplates to provide a capability of re-registering a unique ID of the other communication unit during the transmission of content.

Figure 1:
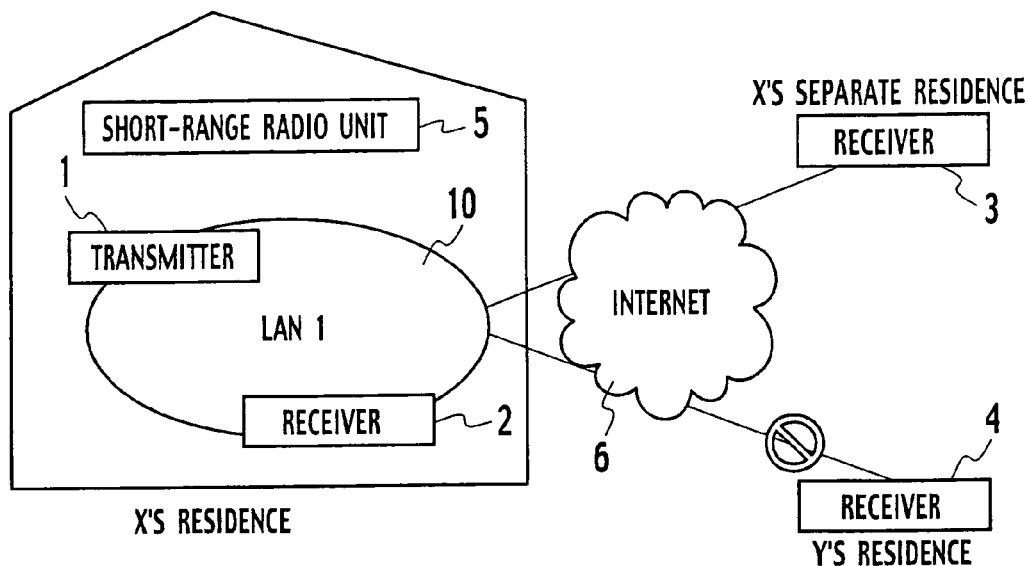
FIG. 1 is a block diagram illustrating one example of a schematic structure of a content transmission and receiving system equipped with an information-processing device according to the present invention.

FIG. 1 is a block diagram showing one example of a schematic structure of a content transmission and receiving system, equipped with an information-processing device as a communication unit, according to the first embodiment. The content transmission and receiving system, shown in FIG. 1, is mainly aimed at allowing AV data to be transmitted and received within an area allowable for individuals to enjoy and comprised of a transmitter 1, connected to a local area network 10 and operative to transmit content, receivers 2, 3, 4 operative to receive content, and a short-range radio unit 5. The short-range radio unit 5 is operative to communicate with the transmitter 1 and the receiver 2 over short-range communication and conceivable to take the form of a remote controller.

In FIG. 1, there is shown an example wherein the transmitter 1 and the receiver 2 connected to the local area network 10 and the short-range radio unit 5 are located in a Mr. X's residence and the receiver 3 is located in a Mr. X's separate residence while the receiver 4 is located in a Mr. Y's residence. Also, the local area network 10 of the Mr. X's residence, the receiver 3 in the Mr. X's separate residence, and the receiver 4 in the Mr. Y's residence are connected via an Internet 6. Locations and connection modes of the transmitter 1 and the receivers 2 to 4 are not limited to those shown in FIG. 1. For instance, routers may be present on connecting paths between the local area network 10, connected to the Internet 6, and the receivers 2 to 4.

As physical layers and link layers of the local area network 10 of FIG. 1, a variety of forms may be available which includes a wireless LAN, based on IEEE802.11, Ethernet (Registered Trade Mark) and IEEE1394. Under situations where Internet Protocol (IP) is used as a network layer of the local area network 10, it may be sufficed for IPv4 or IPv6 to be used. Also, although the local area network 10 may be connected to other units than the transmitter 1 and receiver 2, these other units are omitted herein for the sake of simplicity.

As used herein, the term "content", which is transmitted through the information processing system shown in FIG. 1, refers to moving picture data such as, for instance, MPEG2 and MPEG4, audio data, such as MP3, or digital content such as text data and image data. Here, for the sake of simplicity in description, content of the first embodiment includes digital content (hereinafter merely referred to as content) to be transmitted under execution of copyright protection.

Here, consider a case wherein content is transmitted to the receivers 2 to 4 from the transmitter 1. At this time, the point to be noted is a copyright protection for content. As set forth above, an area available for content to be exchanged is limited to an area within a certain range, for instance, within a legitimate authority area, such as an area defined under the Copyright Act for private use, or limited to an area that is further narrower than the above area, and it is preferred for content to be inhibited for exchange with other persons beyond the limit of such ranges. That is, there is a need for content to be transmitted from the transmitter 1, owned by Mr. X, to the receivers 2, 3 but not to the receiver 4 owned by a different owner.

As for a method of restricting a distribution range to a certain distribution area, an operation sequence of "registration" may be preliminarily provided between the transmitter 1 and the receivers to allow IDs of units, either one of the units or a third unit to be registered for the transmission of content only between registered units. Further, another mechanism may be conceivable in which an area, available to be registered, is limited a physical area in which no transmission of content or no decrypting of encrypted content is permitted between the non-registered units.

Figure 2:
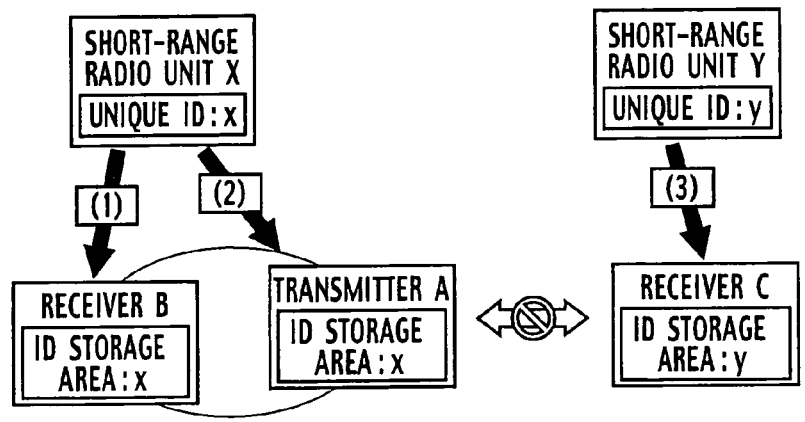
FIG. 2 is a conceptual diagram for illustrating technique in which registering an ID in a unit allows a distribution area of content to be restricted.

FIG. 2 is a conceptual diagram for illustrating technique of restricting a distribution range of content by registering IDs of the units. The short-range radio unit X has a unique non-rewritable ID (hereinafter referred to as a unique ID) and has a function to transmit this unique ID to a transmitter A and a receiver B. The transmitter A and the receiver B, which have received the unique ID from the short-range radio unit X, register a value of this unique ID in respective ID storage areas of the own units. During the transmission of content, the transmitter A and the receiver B check mutually whether the unique ID of one another corresponds to the unique ID registered in the respective ID storage areas of the own units and, only when the unique IDs correspond to one another, content is transmitted and received between the associated units. Instead of the mutual check between the transmitter A and the receiver B, only the transmitter A may check whether the unique ID of the receiver B corresponds to the unique ID registered in the ID storage areas of the transmitter A and, only when the unique IDs correspond, content is transmitted and received between the associated units.

For instance, suppose a value of the unique ID of the short-range radio unit X is "x", the transmitter A and the receiver B, which have received this unique ID "x" from the short-range radio unit X, have the unique ID that is shared to one another and, so, the transmission of content can be executed. In contrast, a receiver C, which has a unique ID "y" of a short-range radio unit Y, has the unique ID "y" in an own ID storage area but has no unique ID "x" and, hence, the receiver C is unable to receive or decrypt content from the transmitter A.

Figure 3:
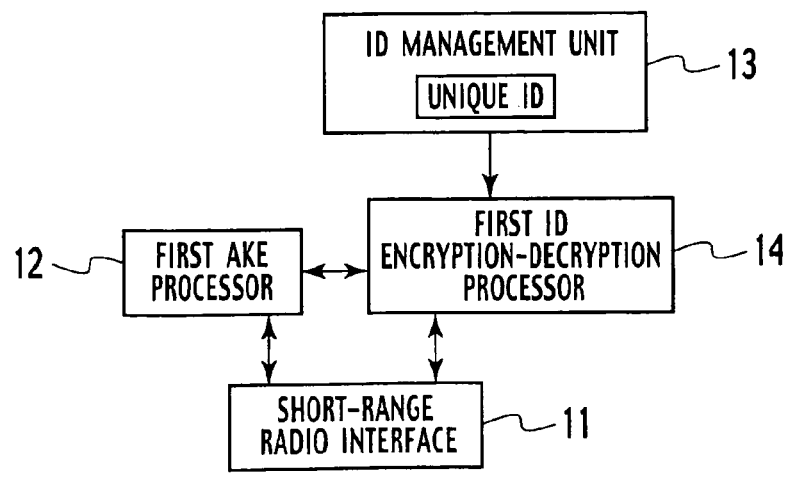
FIG. 3 is a block diagram showing one example of an internal structure of a short-range radio unit X.

FIG. 3 is a block diagram showing one example of an internal structure of the short-range radio unit X. As shown in FIG. 3, the short-range radio unit X includes a short-range radio interface 11, a first authentication and key exchange (AKE) processor 12, an ID management unit 13 and a first ID encryption-decryption processor 14.

The short-range radio interface 11 executes physical layer processing and data link layer processing for executing short-range radio (wireless) communication between the transmitter and the receiver. The first AKE processor 12 executes authentication and key exchange (AKE) processing between the transmitter and the receiver. The ID management unit 13 internally has a unique ID that corresponds to an ID unique to the short-range radio unit X and performs control to transmit the unique ID to the transmitter A and the receiver B. The first ID encryption-decryption processor 14 encrypts the unique ID using a key resulting from AKE processing.

A License Organization may manage unique IDs not to allow different short-range radio units to have the same values of the unique IDs. Using an adequately large value may guarantee a probabilistic uniqueness for the unique IDs within at least one vender. Also, the unique IDs may be preferably maintained under a condition unavailable to be illegitimately acquired or altered by the other units. As used herein, the term "illegitimately" refers to a meaning in that the IDs are acquired or altered by a third party other than particular organizations, such as the License Organization and unit venders who have a right to allocate the IDs, without permission.

Figure 4:
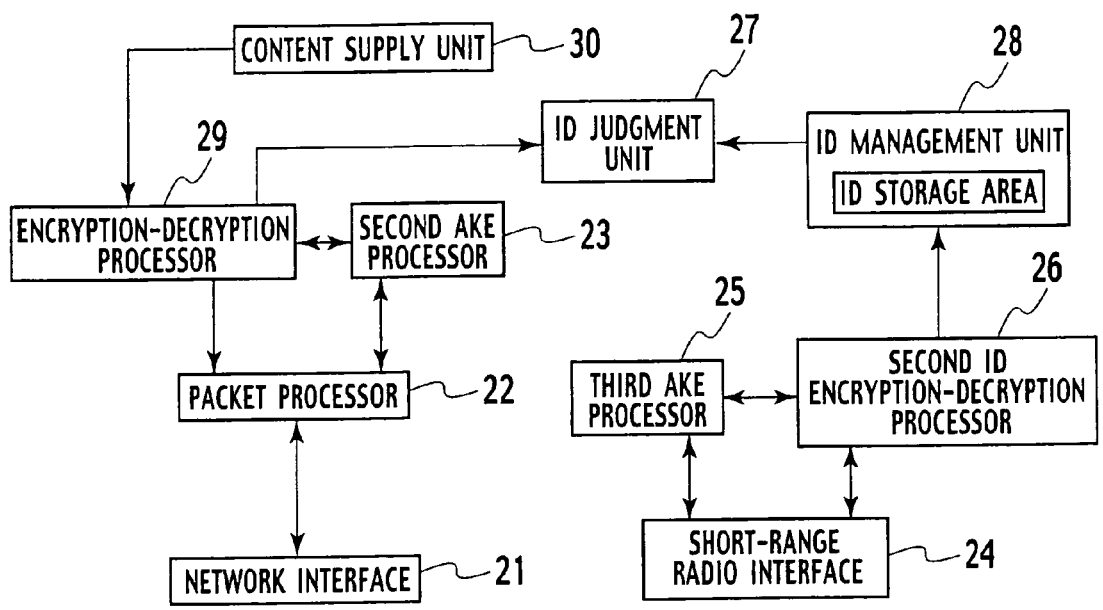
FIG. 4 is a block diagram showing one example of an internal structure of a transmitter A.

FIG. 4 is a block diagram illustrating one example of an internal structure of the transmitter A. The transmitter A, shown in FIG. 4, is comprised of a network interface 21, a packet processor 22, a second AKE processor 23, a short-range radio interface 24, a third AKE processor 25, a second ID encryption-decryption processor 26, an ID judgment unit 27, an ID management unit 28, a encryption-decryption processor 29 and a content supply unit 30.

The network interface 21 executes physical layer processing as well as data link layer processing to enable communication with the receiver B. The packet processor 22 executes network layer and transport layer processing for transmitting content and data, for authentication and key exchange, to and receiving the same from the receiver B. The second AKE processor 23 executes AKE processing with the receiver B via the network interface 21. The short-range radio interface 24 executes physical layer processing and data link layer processing for achieving communication with the short-range radio unit X over short-range radio communication. The third AKE processor 25 executes AKE processing with the short-range radio unit X. The second ID encryption-decryption processor 26 decrypts the unique ID of the short-range radio communication unit X using a key resulting from the execution of AKE processing with the short-range radio communication unit. The ID judgment unit 27 discriminates whether a value of an ID, inputted from the receiver B via the network interface 21, is registered in the ID storage area of the own unit. The ID management unit 28 permits the unique ID of the short-range radio unit X to be inputted from the short-range radio interface 24 for registration in the ID storage area. The encryption-decryption processor 29 encrypts content to be transmitted to the receiver B. The content supply unit 30 stores content to be supplied to the packet processor 22.

Also, the unique ID of the short-range radio unit X, registered in the ID storage area, may be preferably encrypted, using a key allocated uniquely to the transmitter A for a registration, and may be decrypted depending on needs, so as not to be illegitimately acquired or tampered by any other units.

A series of above-mentioned operations are executed by short-range radio communication via the short-range radio interfaces 11, 24 provided in the transmitter A, the receiver B and the short-range radio unit X, respectively. Based on round trip time (RTT) measured between the transmitter A or the receiver B and the short-range radio unit X, the series of above-mentioned operations can be executed only if the measured RTT is less than a given threshold value.

Further, in the following exemplary case, it is supposed that the packet processor 22 employs an Internet Protocol. The term "short-range radio communication" refers to radio communication utilized through, for instance, infrared ray radiation and radio frequency tag (RF tag) but the present invention is not necessarily limited to such radio communication.

Information to be processed in the network interface 21 is performed on Internet Protocol and, hence, is not limited in a physical range. In the meanwhile, the short-range radio interface 24 limits a physical range in which information is exchanged by means of infrared ray radiation and radio frequency tags or IC cards and magnetic cards (in the form of non-radio transmission).

Figure 5:
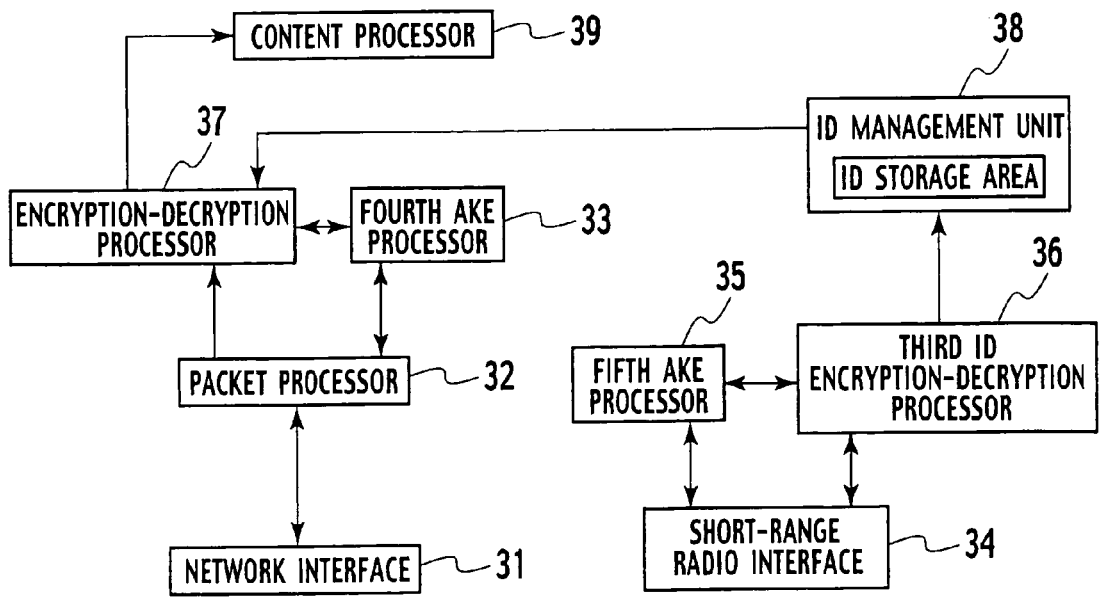
FIG. 5 is a block diagram showing one example of an internal structure of a receiver B.

FIG. 5 is a block diagram illustrating one example of an internal structure of the receiver B. The receiver B, shown in FIG. 5, is similar in internal structure to the transmitter A of FIG. 4 and differs from the transmitter A of FIG. 4 in that a content processor 39 is provided instead of the content supply unit 30 and the ID judgment unit 27, and an ID management unit 38 is directly connected to a encryption-decryption processor 37. Also, the encryption-decryption processor 37 encrypts the unique ID contained in the ID storage area of the short-range radio unit for transmission to the transmitter A.

Further, the ID management units 28, 38, incorporated in the transmitter A and the receiver B, respectively, have functions to receive the unique ID from the short-range radio unit X to allow the unique ID to be registered in the respective ID storage areas only when the AKE processors 25, 35 authenticate that the communicating parties are legitimate units. Information to be contained in the respective ID storage areas may include, in addition to the unique ID of the short-range radio unit X, an option item such as a registration date and hour at which the ID is registered.

As used herein, the term "AKE processing" refers to the operation in that the transmitter A, the receiver B and the short-range radio unit X are permitted to execute the authentication with respect to one another about whether they correctly have a license from a certain Licensor Organization when these units are recognized as legitimate units, a shared key is generated. An authenticating method may include a well-known method such as ISO/IEC 9798-3 and ISO/IEC 9798-2. Also, the encryption-decryption processors 29, 37 and the ID encryption-decryption processor 14, 26, 36 have functions to encrypt content or the unique ID using the shared key generated through the execution of the authenticating operation and an algorithm for encrypting and decrypting these data may include a well-known method such as AES and DES.

Now, description is made of a sequence of operations to be executed among the transmitter A, the receiver B and the short-range radio unit X for the transmission of content. The operations, to be performed when transmitting content from the transmitter A to the receiver B, fall into two phases including an "ID registration phase" and a "content transmission phase".

Figure 6:
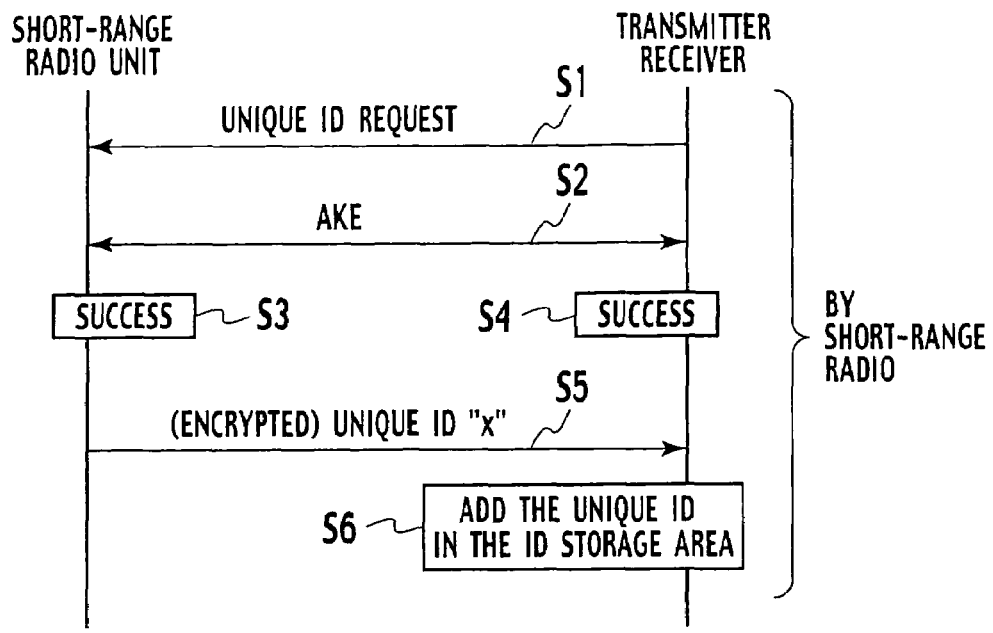
FIG. 6 is a sequence diagram showing one example of an ID registering phase.

The "ID registration phase" is a phase in which the unique ID of the short-range radio unit X is configured to be registered in the storage areas of the transmitter A or the receiver B. FIG. 6 corresponds to this phase.

Figure 7:
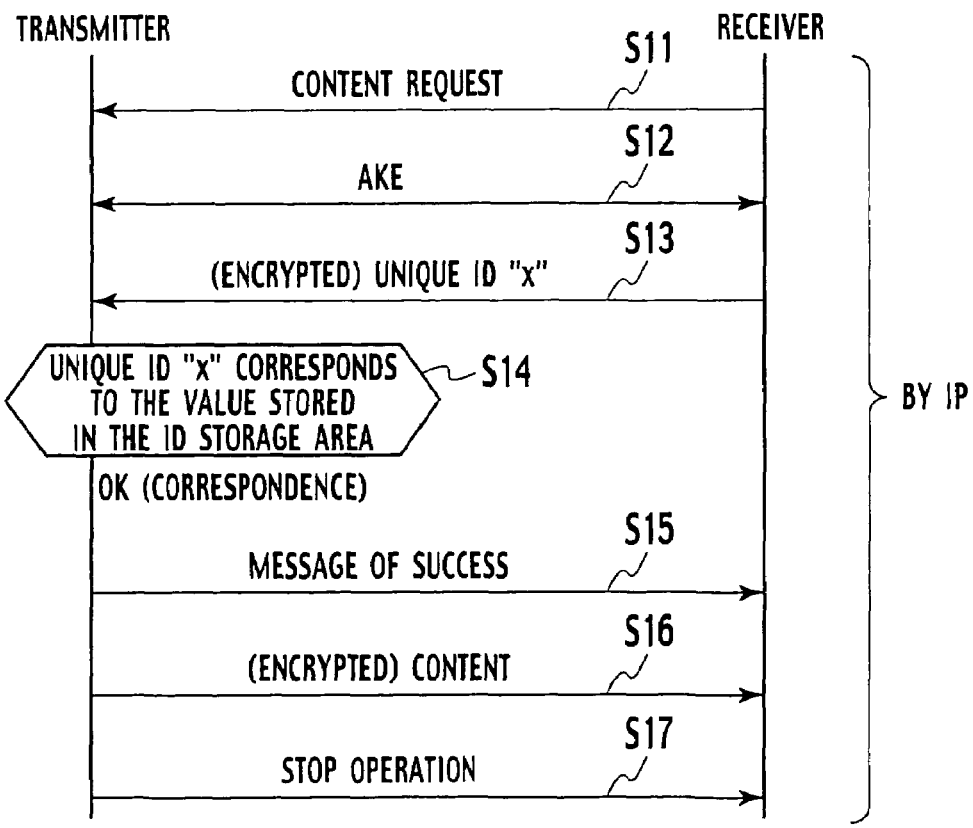
FIG. 7 is a sequence diagram showing one example of a content transmission phase.

The "content transmission phase" is followed by the transmission of content between the transmitter A and the receiver B. In the "content transmission phase", the operation is executed to check whether the transmitter A and the receiver have the ID of the short-range radio unit X shared with one another, the transmission of content is permitted if the transmitter A and the receiver B have the same ID as that of the short-range radio unit X and, if not, the transmission or encryption-decryption of content is rejected. FIG. 7 corresponds to this phase.

In such a way, the "ID registration phase" is surely carried out prior to executing the "content transmission phase". Also, in the "ID registration phase", the transmitter A, the receiver B and the short-range radio unit X are configured operative whereas in the "content transmission phase", the transmitter A and the receiver B are configured operative.

First, the operation for the "ID registration phase" is described. FIG. 6 is a view illustrating one example of a sequence of operations to carry out the "ID registration phase" and shows the sequence of operations until the ID of the short-range radio unit X is registered in the ID storage areas. The operation is performed for registering the ID of the short-range radio unit X in the transmitter A. Initially, the transmitter A transmits a unique ID request to the short-range radio unit X (step S1). Upon receipt of this request, the short-range radio unit X and the transmitter A execute authentication with respect to one another about whether they are legitimate units and, consecutively, execute key exchange processing (step S2). If the authentication is in failure, given error operation is executed and then no subsequent operation proceeds.

If the authentication is successful (steps S3, S4), that is, when confirmation is made with respect to one another that they are legitimate units, the short-range radio unit X transmits the unique ID to the transmitter A (step S5). In this event, the unique ID may be preferably encrypted or added with an electronic signature using the shared key, obtained as a result of executing AKE processing, to preclude the unique ID from being altered over a communication pathway.

Upon receipt of the unique ID, the transmitter A adds this unique ID in the ID storage area of the own unit (step S6).

Also, such a series of these operations are executed over short-range radio communication through the use of the short-range radio interfaces 11, 24, 34 of the transmitter A, the receiver B and the short-range radio unit X, respectively.

Through the execution of the above operations, the transmitter A and the receiver B are able to register the unique ID of the short-range radio unit X in the respective ID storage areas.

Also, while FIG. 6 shows an example wherein unique ID request is transmitted from the transmitter A to the short-range radio unit X, in contrast, unique ID request may be transmitted from the short-range radio unit X to the transmitter A to commence short-range AKE processing.

Next, the "content transmission phase" is described in detail. FIG. 7 is a view illustrating one example of a sequence of operations to execute the "content transmission phase". First, the receiver B transmits content request to the transmitter A (step S11). Upon receipt of this request, the transmitter A and the receiver B executes AKE processing with respect to one another (step S12). If AKE processing is normally completed to allow a key to be shared by the transmitter A and the receiver B, then, using the shared key allows the receiver B to encrypt the unique ID, stored in the own unit, for transmission (step S13). Upon receipt of the unique ID of the receiver B, the transmitter A executes discriminating whether the received unique ID corresponds to a value stored in the ID storage area of the own unit (step S14). In this event, the unique ID "x" of the short-range radio unit X is contained in the ID storage area of the receiver B and the unique ID "x" of the short-range radio unit X is also contained in the ID storage area of the transmitter A, this discriminating operation is successful. If the discriminating operation is in success, a message, giving such a notice, is transmitted to the receiver B (step S15) and, thereafter, the transmitter A commences the transmission of content (step S16). Subsequently, the transmitter A executes content transmission stop operation (step S17).

Also, such a series of operations in the "content transmission phase" are carried out though the use of the same interfaces as those used for transmitting and receiving content.

With the sequence set forth above, in the "content transmission phase", only the transmitter A and receiver B, registered in the short-range radio unit X, are enabled to execute the transmission of content.

Although the foregoing exemplary case has been described with respect to the operations wherein the receiver B transmits the unique ID to allow the transmitter to execute the comparing and discriminating operations between the unique ID registered in the ID storage area of the own unit and the unique ID received from the receiver, the operation may be executed vice versa, that is, the receiver may execute the comparing and discriminating operation. In such a case, the ID judgment unit is not incorporated in the transmitter but provided in the receiver. Of course, both the transmitter and receiver may include the respective ID judgment units to allow the unique ID to be transmitted to one another for discrimination processing.

The above exemplary case has been described with reference to an example wherein the short-range radio unit X allows the transmitter A and the receiver B to register the ID of the short-range radio unit X. For applications of this form, a case may be conceivable in which a plurality of short-range radio units are present in one residence and a unique ID of another short-range radio unit is re-registered in the transmitter A and the receiver B by which the registration of the unique ID has been already completed once.

Figure 8:
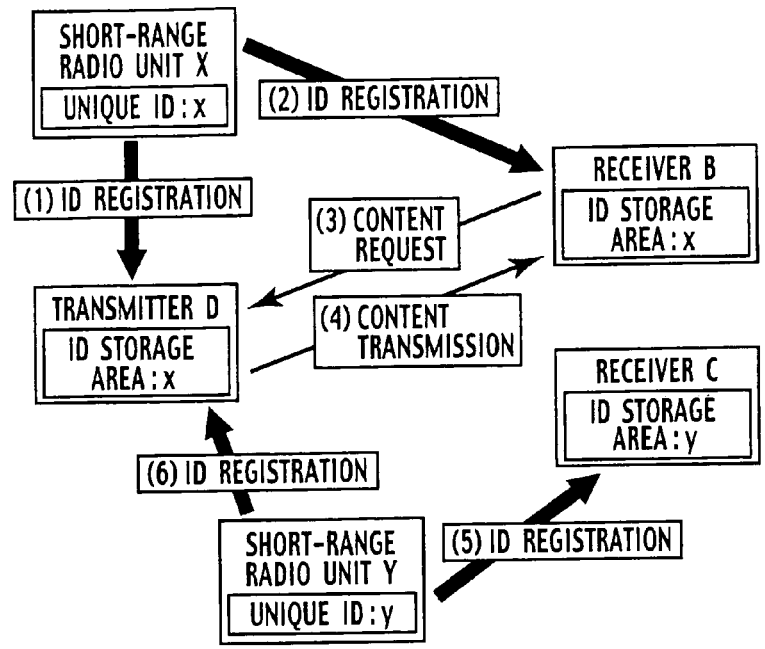
FIG. 8 is a view illustrating issues arising when re-registering the unique ID.

As shown in FIG. 8, first, the unique ID of the short-range radio unit X is registered in both of a transmitter D and the receiver B. Such an operation may follow the method of "ID registration phase" shown in FIG. 6. Then, the receiver B transmits content request to the transmitter D and, upon receipt of this request, the transmitter D executes the check operation whether it has the unique ID shared with the receiver B. If the unique ID is shared, the transmitter D commences the transmission of content. This operation may follow the method of the "content transmission phase" shown in FIG. 7.

Now, suppose that there exists other short-range radio unit Y than the short-range radio unit X, and a receiver C in which a unique ID of the short-range radio unit Y is registered. If it is assumed that, even when the transmitter D is transmitting content to the receiver B, the unique ID of the short-range radio unit Y can be registered in the transmitter D without interrupting the transmission of content to the receiver B, the receiver C has a capability of receiving content from the transmitter D independently of the receiver B with resultant easy-to-use service for users.

For instance, suppose that the transmitter D is operative to receive a digital broadcast and includes a tuner equipped with an HDD. Now, even when the digital broadcast is being watched by the receiver B on live, the unique ID of the short-range radio unit Y can be registered in the transmitter D for the purpose of permitting the receiver C, in which the unique ID of the short-range radio unit Y is registered, to watch content stored in the HDD of the transmitter D.

Therefore, with the first embodiment, a feature exists in that under circumstances where the transmitter D transmits content to the receiver B, the operation can be executed to register a unique ID of the other short-range radio unit than the currently registered short-range radio unit while continuously executing the above transmission.

Figure 9:
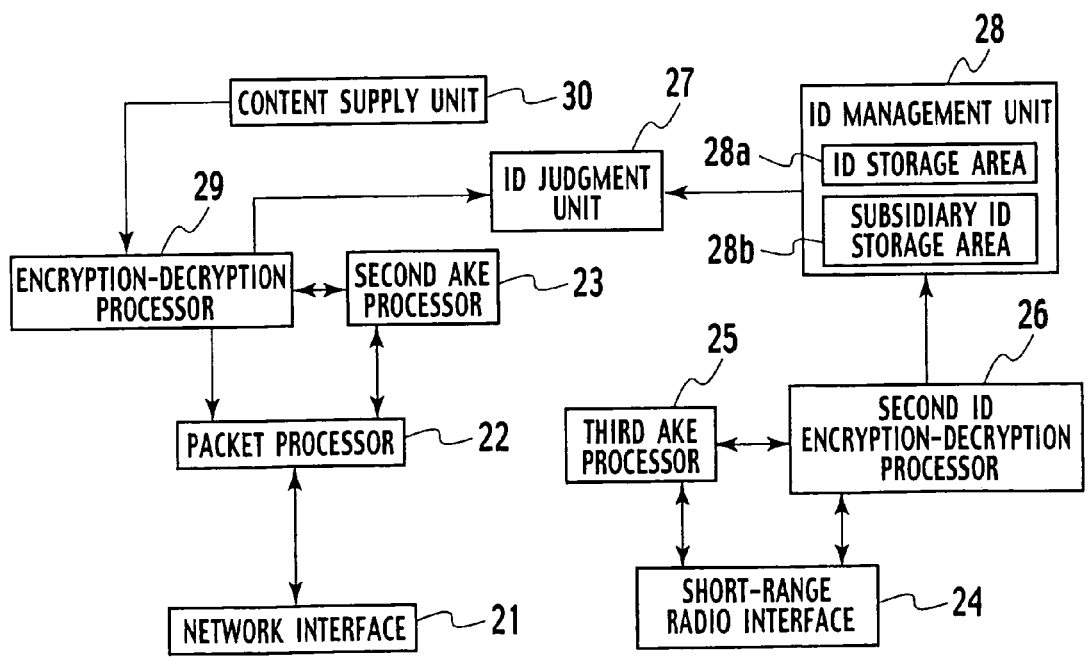
FIG. 9 is a block diagram showing one example of an internal structure of a transmitter D of the presently filed embodiment.

FIG. 9 is a block diagram showing an internal structure of the transmitter D of the first embodiment. The transmitter D, shown in FIG. 9, differs from the structure of FIG. 4 in that the ID management unit 28 incorporates an ID storage area 28a, a subsidiary ID storage area 28b and has a function to discriminate whether the unique ID received from the receiver is contained in the ID storage area 28a or the subsidiary ID storage area 28b.

Figure 10:
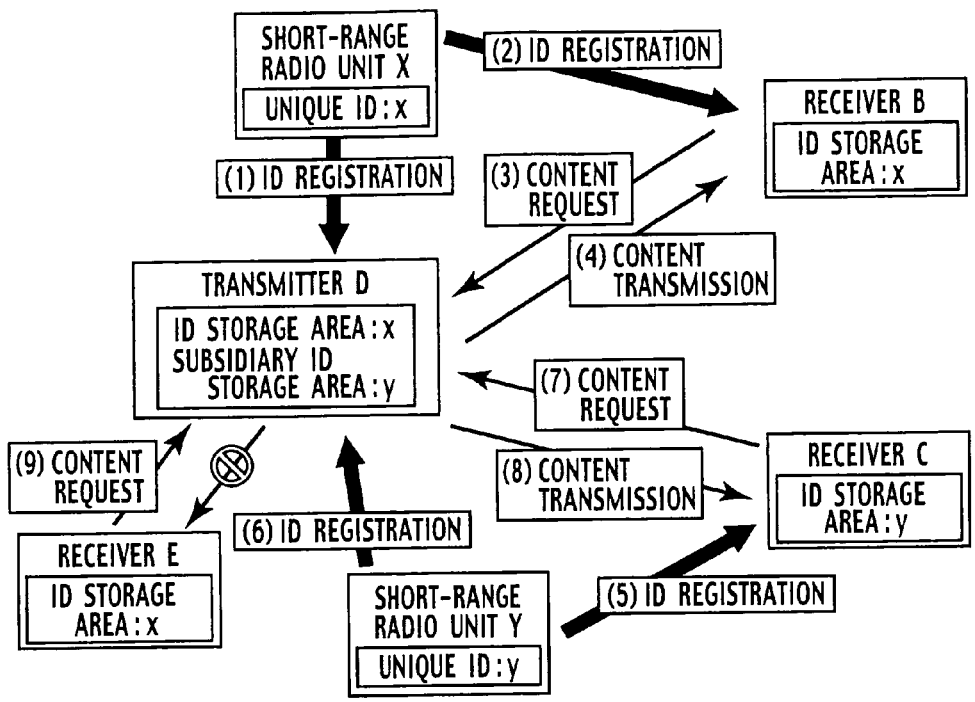
FIG. 10 is a conceptual diagram for illustrating how distributions of content are restricted by an order in which the unique IDs are registered.

FIG. 10 is a conceptual diagram for illustrating how a distribution range for content is restricted in accordance with a sequence of operations for registering the unique ID. First, the unique ID of the short-range radio unit X is registered in the transmitter D and the receiver B. With the transmitter D and the receiver B sharing the same unique ID as that of the short-range radio unit, the transmission and receiving of content can be achieved.

During a period in which the transmitter D transmits content to the receiver B, the unique ID is registered in the receiver C and the transmitter D by the use of the short-range radio unit Y instead of the short-range radio unit X. The registering operation allows the transmitter D and the receiver C to have the same unique ID as that of the short-range radio unit, thereby making it possible for the receiver C to receive content from the transmitter D.

Suppose that under such a situation, a receiver E, which has the unique ID of the short-range radio unit X, makes content request to the transmitter D. When this takes place, the transmitter D may preferably remain under a condition wherein re-registration is conducted by the short-range radio unit Y.

Also, the transmitter D may preferably deny the receipt of request from the receiver that originally has the ID of the short-range radio unit X.

Figure 11:
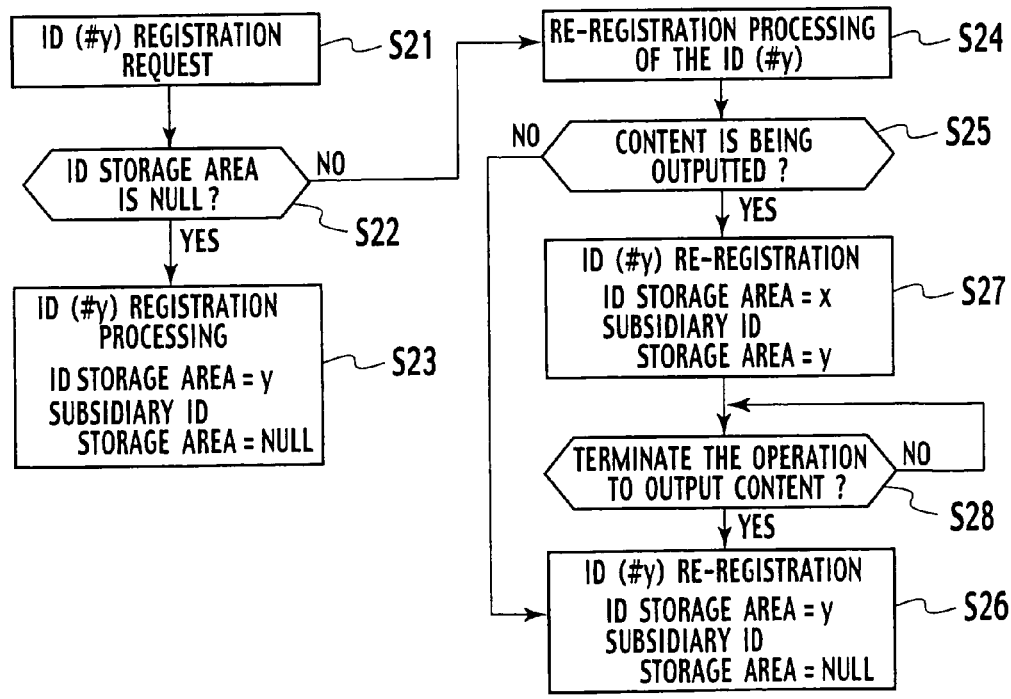
FIG. 11 is a flowchart illustrating one example of an operation sequence of the transmitter D when receiving registration request from the short-range radio unit.
Figure 12:
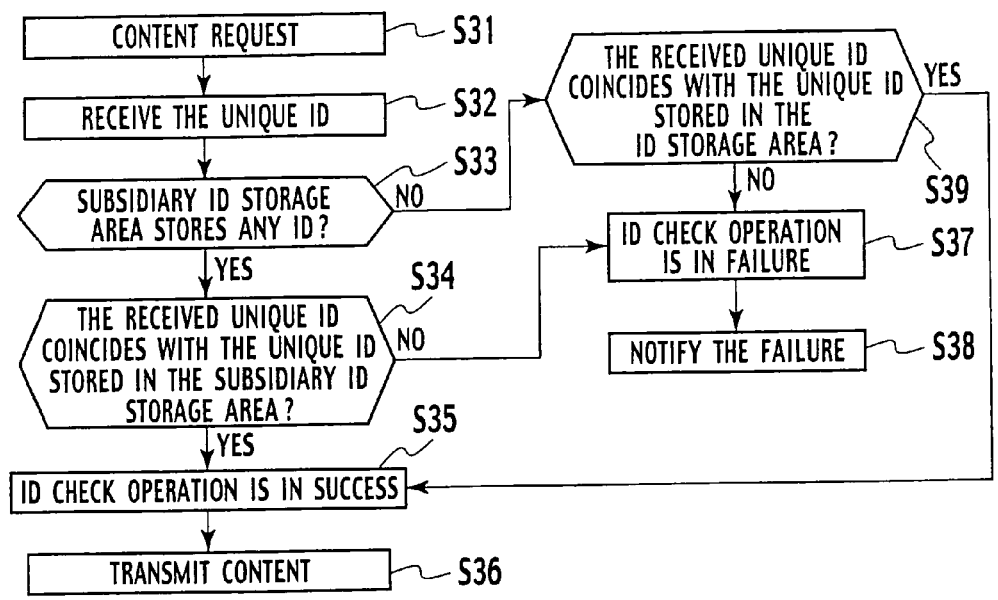
FIG. 12 is a flowchart illustrating one example of an operation sequence of the transmitter D upon receipt of content request.

Hereunder, description is made of technique for realizing a status shown in FIG. 10. FIGS. 11 and 12 show operation sequences of the transmitter D, respectively.

FIG. 11 is a flowchart showing one example of the operation sequence of operations to be executed by the transmitter D with registration request received from the short-range radio unit. First, the transmitter D accepts ID registration request from the short-range radio unit Y (step S21). When this takes place, the transmitter D checks whether the unique ID is registered in the ID storage area 28a (step S22). If the IDs are not registered at all, then, ID registration processing is executed (step S23), resulting in the occurrence of the unique ID of the short-range radio unit Y being registered in the ID storage area 28a.

In step S22, if discrimination is made that the unique ID is already registered in the ID storage area 28a, it is judged that the operation is involved in re-registration processing (step S24). Next, the operation is executed to check whether the transmitter D remains in a condition under which content is being outputted (step S25). If content is not being outputted, the unique ID, registered in the ID storage area 28a, is updated into the unique ID of the short-range radio unit Y (step S26). Under a circumstance where content is outputted, the unique ID of the short-range radio unit Y is registered in the subsidiary storage area 28b (step S27) and, upon terminating the operation to output content, the unique ID, registered in the subsidiary ID storage area 28b, is shifted to the ID storage area 28a (step S28).

Also, although for the sake of simplicity, no illustration is made of a case where the re-registration is executed upon receipt of registration request from the short-range radio unit, which has the same unique ID as that already registered, that is, when re-registering the unique ID using the same short-range radio unit, the operation may be executed to interrupt the registering operation or carry out given error operation while giving a notice to a user that the ID is already registered in the short-range radio unit.

Further, in order to discriminate whether content is being outputted, there are some methods, for example, (1) a method in which the AKE processor executes AKE processing with the receiver upon which confirmation is made to find whether there is a status in which a key for encrypting content is generated; and (2) a method in which the AKE processor confirms whether the encryption-decryption processor is being in operation. When taking the method (1), the ID judgment unit has a function to execute communication with the AKE processor and inquire for information whether the AKE processor has generated the key for encrypting content. If content is being transmitted to the receiver, the AKE processor has the key for encrypting content. Checking, whether this key is present or whether the transmission of content is terminated and the key is invalid, makes it possible to discriminate whether content is being outputted.

FIG. 12 is a flowchart illustrating one example of an operation sequence to be executed by the transmitter D upon receipt of content request. First, the transmitter D receives content request from the receiver (step S31) and consecutively receives the unique ID (step S32). The transmitter D discriminates whether some IDs are registered in the subsidiary ID storage area 28b (step S33). If no registration is found, the operation is executed to make comparison between the unique ID received from the receiver and a value of the unique ID registered in the ID storage area 28a (step S34).

If coincidence between the received unique ID and the registered unique ID is detected in step S34, the ID check operation is in success (step S35), commencing to transmit content (step S36). If no coincidence is found, given error operation is executed (step S37) and a message is transmitted to the receiver giving notice for the occurrence of a failure in the ID check operation (step S38).

On the contrary, if in step S33, the unique ID is already registered in the subsidiary ID storage area 28b, discrimination is made to find whether a value of the subsidiary ID storage area 28b coincides with a value of the unique ID received from the receiver (step S39). If coincidence is found, a message is transmitted to the receiver notifying the presence of a success in the ID check operation, commencing to transmit content (step S36). If no coincidence is found, a message is transmitted to the receiver notifying the failure in the ID check operation.

Also, the presence of the unique ID already registered in the subsidiary ID storage area 28b means that unique ID re-registration processing is conducted when receiving content.

In the sequence shown in FIG. 12, under a situation in which some unique IDs are registered in the subsidiary ID storage area 28b, no comparing operation is conducted with respect to the unique ID registered in the ID storage area 28a. This means that under circumstance where unique ID re-registration processing is conducted when receiving content, the operation is executed not to accept content request from the receiver, which has the same value of the original unique ID present before re-registration processing is conducted, that is, the receiver that has the same value of the unique ID registered in the ID storage area 28a of transmitter.

Next, the operation of the transmitter is described using the example of FIG. 10. First, the unique ID of the short-range radio unit X is registered in the ID storage area 28a of the transmitter D. Subsequently, the ID check operation is executed with the receiver B to check a coincidence related to the unique ID registered in the ID storage area 28a, commencing to transmit content.

Thereafter, under a situation where the transmitter D is transmitting content to the receiver B, using the short-range radio unit Y allows the transmitter D to execute unique ID registering operation. In such a situation, the unique ID of the short-range radio unit Y is registered in the subsidiary ID storage area 28b. Then, the ID check operation is executed with the receiver C, commencing to transmit content. Here, the operation is executed to conduct coincidence checking with respect to the subsidiary storage area 28b.

Subsequently, under a condition where the transmitter D is transmitting content to the receivers B and C, attempt is made to execute the ID check operation with a receiver E. Here, following the operation sequence shown in FIG. 12, coincidence comparing operation is executed between a value "x", registered in an ID storage area of the receiver E, and a value "y" registered in the subsidiary ID storage area 28b of the transmitter D upon which no coincidence is found between these values with a failure in the ID check operation, no operation is executed to transmit content.

While the operation sequence shown in FIG. 12 has been described with reference to a method in which after re-registration processing executed when transmitting content, the operation is executed to deny the ID check requested from the receiver that has the unique ID registered in the ID storage area 28a, the ID check request may be accepted by setting a particular condition.

Figure 13:
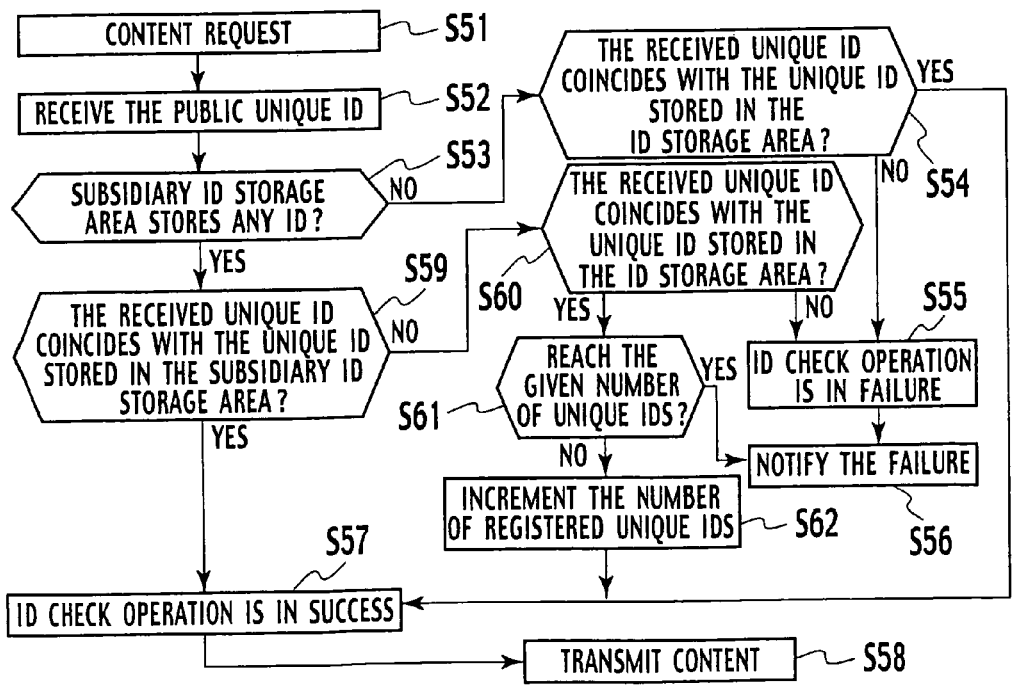

FIG. 13 is a flowchart illustrating one example of an operation sequence to be executed by a transmitter that determines whether to transmit content depending on the number of receivers registered in the ID storage area 28a. Upon receipt of content request and public unique ID from the receiver (steps S51, S52), the operation is executed to check whether the any ID is registered in the subsidiary ID storage area 28b (step S53). If no registration is present, the operation is executed to check whether the received unique ID is registered in the ID storage area 28a (step S54).

Here, if no coincidence is found, discrimination is made that the coincidence check for the unique ID is in failure (step S55), thereby executing given error operation (step S56). If the coincidence is successfully in step S54 (step S57), a message is transmitted to the receiver giving notice for the presence of a success in the ID check (step S58), commencing to transmit content.

In contrast, if discrimination is made in step S53 that the registration is present, then, the operation is executed to check whether the received unique ID coincides with the unique ID registered in the subsidiary ID storage area 28b (step S59). If no coincidence is found, discrimination is made to find whether the received unique ID coincides with the unique ID registered in the ID storage area 28a (step S60). If no coincidence exists, the operation proceeds to step S55 and, if coincidence exists, the operation is executed to check whether the number of unique IDs registered in the ID storage area 28a reaches a given value (step S61). If the checked number is found to reach the given number of units, given error operation is executed in step S56 and, if not, the number of registered unique IDs is incremented (step S62) whereupon the operation proceeds to step S57. Also, as means for managing the number of units as to whether the number of receivers reaches a given number of units, it may be sufficed to employ unique IDs of receivers acquired in AKE processing (step S12 in FIG. 7). That is, the unique IDs are recorded as a list in the receiver in step S61 and when content request is made next time (step S51), the operation is executed to check whether the unique ID is registered in the list. If the unique ID is already present in the list, no updating (step S62) of the number of units may be made and, if the unique ID is absent in the list, the operation may be executed to update number of units.

In such a way, with the first embodiment, even in a condition under which the transmitter, which has a unique ID of a first short-range radio unit, is transmitting content to a first receiver, the transmitter is enabled to execute unique ID re-registration processing upon receipt of unique ID registration request from a second short-range radio unit. With the transmitter having two areas for registering unique IDs of short-range radio units, content can be transmitted to the second receiver, which has the same unique ID as that of the second short-range radio unit, without interrupting the transmission of content to the first receiver.

Further, upon the completion of operations wherein after unique ID re-registration processing has been executed, the operation is executed to limit content request from the receiver that has the unique ID of the first short-range radio unit whereas the transmission of content to the receiver, which has the unique ID of the second short-range radio unit, is permitted and the transmission of content to the first receiver is terminated, since the unique ID of the first short-range radio unit, which is originally registered, is deleted, it becomes possible to prevent content from concurrently transmitted to the receivers that have the unique IDs of different short-range radio units.

Second Embodiment

A second embodiment contemplates to manage a content ID and a unique ID in pair.

With the first embodiment, there has been shown the method in which, even if the transmitter is transmitting content, using the other short-range radio unit realizes to execute re-registration processing of the unique ID. With the second embodiment, while the above-described re-registration processing is realized, it is contemplated to realize determination whether to reject the transmission and receiving of content in accordance with the unique ID of the short-range radio unit, which the receiver owns, and content requested by the receiver.

Figure 14:
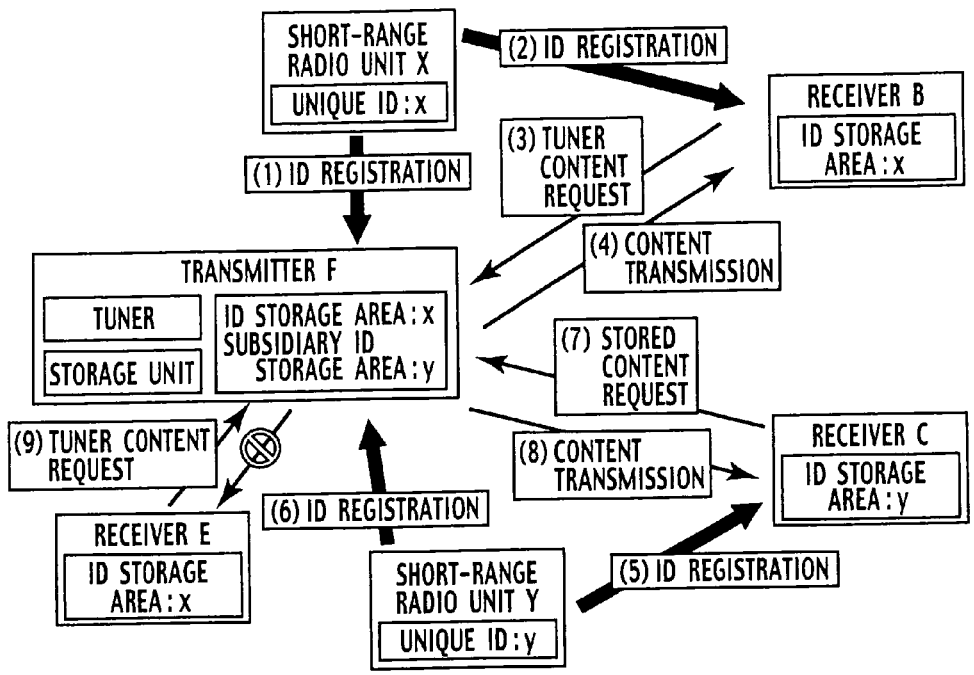
FIG. 14 is a conceptual view illustrating how the distributions of content are restricted depending on a kind of content.

FIG. 14 is a conceptual diagram illustrating how distribution of content is limited by a registering sequence of the receiver and a kind of content to be transmitted by the transmitter. First, the ID of the short-range radio unit X is registered in a transmitter F and a receiver B. The transmitter F and the receiver B have an ID of the same short-range radio unit under which the transmission and receiving of content is enabled, thereby commencing the transmission and receiving of content.

Here, suppose that the receiver B is receiving tuner content of the transmitter F. Also, as used herein, the term "tuner content" refers to a channel (program) received from, for instance, a broadcast station.

Next, during the operation in which tuner content is transmitted from the transmitter F to the receiver B, the ID is registered in a receiver C and the transmitter F using the short-range radio unit Y independent from the short-range radio unit X. This allows the transmitter F and the receiver C to have the ID of the same short-range radio unit and the receiver C is enabled to receive content from the transmitter F.

Here, suppose that the receiver C is receiving stored content from the transmitter F. Also, as used herein the term "stored content" refers to content, or the like, that is registered in media such as, for instance, hard discs and DVDs and, for the purpose of essentially representing content to be different from content that is transmitted to the receiver B, an expression of "stored content" is used herein. It is assumed that, under such a situation, the receiver E, having the ID of the short-range radio unit Y, makes request to the transmitter F for transmitting content.

When this takes place, since the transmitter F has completed re-registration processing using the short-range radio unit Y, the ID check operation is permitted with no problems. However, the second embodiment differs from the first embodiment in that request is made for the same content as that of the receiver B, having the ID of the short-range radio unit X, and, for the purpose of avoiding the same content from being transmitted to the receivers that are registered by the different short-range radio units, request from the receiver E is rejected.

Thus, the second embodiment is intended to allow the other receiver to be re-registered using the other short-range radio unit during the transmission of content for thereby preventing the same content from being simultaneously transmitted to two domains even while enhancing easy-to-use service for users. Hereunder, description is made of a method of realizing an aspect shown in FIG. 14.

Figure 15:
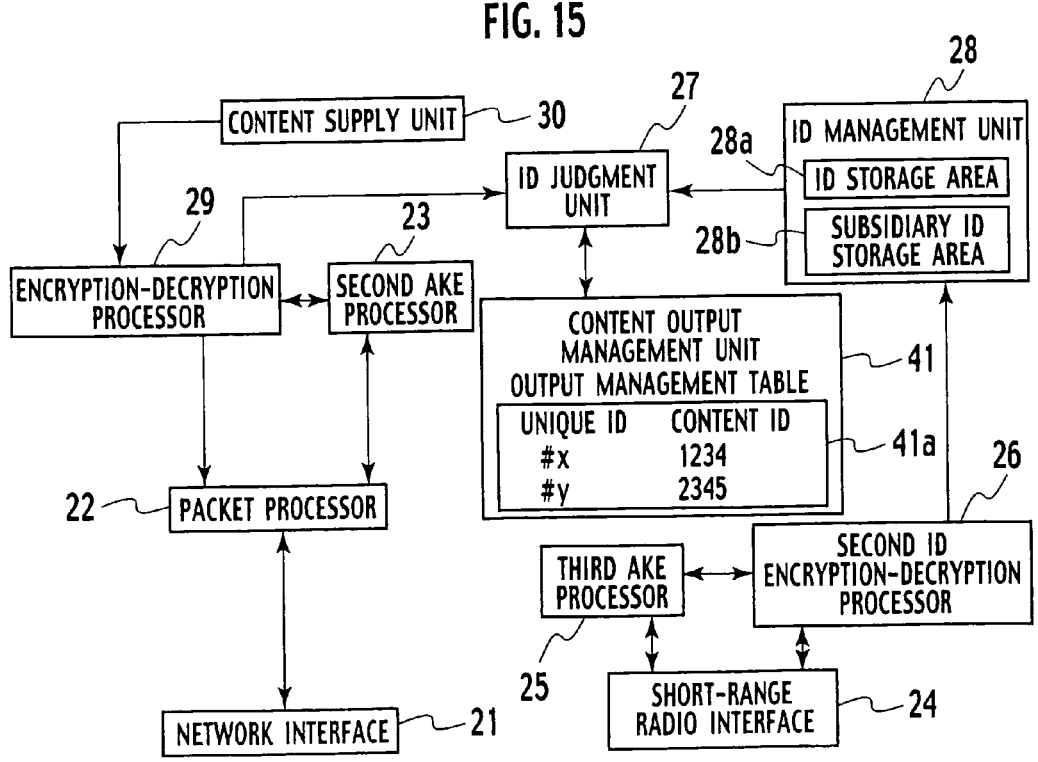
FIG. 15 is a block diagram showing one example of an internal structure of a transmitter F of a second embodiment.

FIG. 15 is a block diagram illustrating one example of an internal structure of the transmitter F of the second embodiment. A difference with respect to the transmitter D, shown in FIG. 9, resides in that a content output management unit 41 is provided. The content output management unit 41 includes an output management table 41a that manages which content is outputted from the own unit to the receiver that has the unique ID of which short-range radio units. The content output management unit 41 discriminates whether to allow the transmitter, which has a success in the ID check operation, to transmit content.

FIG. 16 is a view showing one example of the output management table 41a for use in determining availability for content to be transmitted or received. The output management table 41a includes a compulsory item, involving a unique ID and a content ID, and an option item involving a device unique ID of the receiver.

As used herein, the term "content ID" refers to information by which currently outputted content is univocally specified. For instance, in case of stored content, a combination between a pass name and file name designating the content, or a file pointer designating realities of a file, corresponds to the content ID and, in case of a broadcast program, a combination between a pass name and file name designating channels and actualities of the channels, or a file pointer designating realities of the channels, corresponds to the content ID. The content ID may be a content ID for a set of plural contents. For example, the content ID represents a content group including plural contents transmitted from respective content sources, such as a terrestrial digital tuner, a broadcasting satellite (BS) digital tuner, and DVD player.

No need necessarily arises for the content ID to be univocally specified prior to outputting content, but at a specific point in time, information should be needed to univocally specify content. Also, as used herein the term "device unique ID" refers to information by which each of the receiver and the transmitter is univocally specified and, for instance, corresponds to a device unique ID, involved in a certificate when executing AKE processing, and a unique ID assigned to a network interface such as MAC address.

FIG. 17 is a flowchart illustrating an operation sequence of the transmitter F to be executed upon receipt of content request in the second embodiment. Description is herein made with a focus on a difference with respect to the transmitter D of the first embodiment shown in FIG. 12. It may be sufficed to execute the same operations as those of FIG. 12 until the check operation is executed to confirm whether there is a coincidence between the received unique ID and the value registered in the subsidiary ID storage area 28b (steps S31-S34).

Subsequently, search operation is executed to find whether a content ID"z" is present in the output management table 41a (step S65). Also, the content ID check operation is predicated on a situation in which the unique ID is registered in the subsidiary ID storage area 28b and since there is a situation under which content is already transmitted to the receiver, no probability exists where the output management table 41a is vacant.

The expression "when the content ID"z" is not contained" means that no identical content are transmitted and, so, the operation is executed to add a unique ID"abc" and content ID"z" in the output management table 41a (step S66), thereby commencing to transmit content (step S67).

If the content ID"z" is contained in the output management table 41a, the operation is executed to check whether the unique ID, corresponding to a content ID"z" of the output management table 41a, is "abc" (step S68). If the unique ID is "abc", this means that the receiver, by which the content ID"z" is transmitted, is a receiver that has the unique ID of the same short-range radio unit as that of the receiver which transmits content request, and the transmission of content is permitted. If the unique ID is not "abc", this results in a situation under which the content ID"z" has been already transmitted to the receiver that has the unique ID of the short-range radio unit different from the receiver by which content request is transmitted, and no content is transmitted while executing given error operation (step S69).

On the contrary, if discrimination is made in step S63 that no unique ID is registered in the subsidiary storage area 28b, discrimination is made whether the received unique ID coincides with the value registered in the ID storage area 28a (step S70). If such a coincidence is present, the operation is routed to step S65 and if not, discrimination is made that a coincidence check is in failure (step S71) whereupon the operation is executed to transmit a unique ID check-failure notification message to the receiver (step S72).

FIG. 18 is a flowchart illustrating one example of an operation sequence for content transmission interrupting operation in the second embodiment and shows the operations corresponding to those of FIG. 17. If the transmitter F stops the transmission of content (step S91), the operation is executed to check whether content, represented by the content ID"z", which has been transmitted to the receiver is transmitted to the other receiver (step S92). To distinguish which content is transmitted to which receiver, for instance, the receivers may be managed in terms of IP addresses, or the unique IDs of the output management table 41a, shown in FIG. 16, or the device unique IDs that are defined as the option item may be used. If content identified with the content ID"z" is transmitted to the other receiver, the operations in FIG. 18 are terminated. If no content with the content ID"z" is transmitted to any of the receivers, that is, when the transmission of content with the content ID"z" is completely interrupted, the operation is executed to delete the item of the content, allocated with the content ID"z", from the output management table 41a, thereby executing transmission interrupting operation (step S93).

Also, while the presently filed embodiment has been described with reference to an exemplary case wherein after executing the ID check operation to check whether the received unique ID corresponds to the value registered in the subsidiary storage area 28b, the content ID check operation is executed, the ID check operation and the content ID check operation may not necessarily need to be executed in this order. That is, upon receipt of content request, the transmitter F may execute the content ID check operation first and subsequently execute the ID check operation.

Thus, with the second embodiment, the unique ID of the short-range radio unit, owned by the receiver, and the content ID are registered in the output management table 41a and, prior to transmitting content to the receiver, the content output management unit 41 conducts a search to find whether the unique ID of the short-range radio unit, owned by the receiver, is present in the output management table 41a in which the output status of content is registered, whereby conditions, under which content is outputted, are altered depending on the presence of or the absence of the unique ID. This provides a capability of avoiding the same content from being simultaneously transmitted to the receivers that have unique IDs of different short-range radio units.

At least a part of the transmitter and the receiver, which have been described above in respect of the embodiment set forth above, may be embodied in hardware or may take the form of software. When embodied in software, program code, which realizes at least partial functions of the transmitter and the receiver, may be implemented in record media, such as floppy discs or CD-ROMs, which are loaded into and executed by a machine such as a computer. Record media may not be limited to those, which are portable, such as magnetic discs and optical discs and may include stationary type record media, such as hard disc drives, memories or any other machine-readable storage medium.

Further, another alternative may be undertaken to allow the program, which realizes the function of at least a portion of the transmitter and the receiver, to be distributed via a communication line such as Internet including a wireless communication. Additionally, under circumstances where the program is encrypted, modulated or compressed, the program may be distributed via a cable communication line or a radio communication or may be incorporated in record media for distribution.

What is claimed is:

1. An information-processing device comprising:
    a first interface configured to transmit content to at least one of a plurality of communication units belonging to a first group through a network;
    a second interface configured to receive unique identifications assigned to a plurality of communication units belonging to a second group;
    a first storage area configured to store a first unique identification received through the second interface, the first unique identification being assigned to a first communication unit belonging to the second group;
    a first judgment unit configured to determine whether a unique identification received through the first interface is stored with a same value as the first unique identification in the first storage area, the unique identification being registered to the first communication unit belonging to the first group;
    a content supply unit configured to transmit the content to the first communication unit belonging to the first group via the first interface when the first judgment unit determines that the unique identification is stored with the same value as the first unique identification in the first storage area;
    a second storage area configured to store a second unique identification received from a second communication unit belonging to the second group through the second interface while the content supply unit transmits the content to the first communication unit belonging to the first group through the first interface; and
    a management unit configured to delete all stored unique identifications from the first storage area and shift the second unique identification from the second storage area to the first storage area when the content supply unit has transmitted the content to the first communication unit belonging to the first group completely.

2. The information-processing device according to claim 1, wherein
    the first interface transmits the content in accordance with an Internet Protocol, and
    the second interface receives and transmits a unique identification assigned to a communication unit belonging to the second group only when a round trip time to receive and transmit data between the second interface and the communication unit is less than a given value.

3. The information-processing device according to claim 1, further comprising:
    an authentication-and-key-exchange processor configured to perform an authentication-and-key-exchange processing so as to exchange a key for encrypting the content with the first communication unit belonging to the first group, wherein the management unit determines that the content is transmitted completely and then the key is deleted.

4. The information-processing device according to claim 1, further comprising:
a second judgment unit configured to determine whether a value of unique identification received through the first interface is stored in the second storage area while the content supply unit transmits the content to the first communication unit belonging to the first group through the first interface, the unique identification being assigned to the second communication unit belonging to the second group, wherein
the content supply unit transmits the content to the second communication unit belonging to the second group when the second judgment unit determines that the value of the unique identification is stored in the second storage area.

5. The information-processing device according to claim 1, wherein
the content supply unit denies an additional content request from a communication unit, belonging to the first group, that has the first unique identification as its unique identification while the content supply unit transmits the content to the first communication unit belonging to the first group through the first interface.

6. The information-processing device according to claim 4, further comprising:
a third judgment unit configured to determine whether a value of a unique identification received through the first interface is stored in the first storage area while the content supply unit transmits the content to the first communication unit belonging to the first group through the first interface, the unique identification being registered to a third communication unit belonging to the first group; and
a measurement unit configured to measure a total number of communication units, belonging to the first group, to which the content supply unit transmits the content when the third judgment unit determines that the value of the unique identification is stored in the first storage area, wherein
the content supply unit transmits the content to a communication unit, belonging to the first group, that has demanded an additional content request when the total number is less than a given value.

7. An information-processing device comprising:
a first interface configured to transmit content to at least one of a plurality of communication units belonging to a first group through a network;
a second interface configured to receive unique identifications assigned to a plurality of communication units belonging to a second group;
a first storage area configured to store a first unique identification received through the second interface, the first unique identification being assigned to a first communication unit belonging to the second group;
a first judgment unit configured to determine whether a unique identification received through the first interface is stored with a same value as the first unique identification in the first storage area, the unique identification being registered to the first communication unit belonging to the first group;
a content supply unit configured to transmit the content to the first communication unit belonging to the first group via the first interface when the first judgment unit determines that the unique identification is stored with the same value as the first unique identification in the first storage area;
a second storage area configured to store a pair of the unique identification registered to the first communication unit belonging to the first group and a first content identification identifying the content transmitted to the first communication unit belonging to the first group;
a third storage area configured to store a value of a second unique identification received through the second interface while the content supply unit transmits the content to the first communication unit belonging to the first group through the first interface, the second unique identification being assigned to a second communication unit belonging to the second group;
a second judgment unit configured to determine whether a value of unique identification received through the first interface is stored in at least one of the first storage area and the third storage area, the unique identification being registered to a third communication unit belonging to the first group; and
a content output management unit configured to search for the unique identification registered to the third communication unit belonging to the first group by using a second content identification as a search key required by the third communication unit belonging to the first group in the second storage area when the second judgment unit determines that the value of the unique identification is stored in at least one of the first storage area and the third storage area, wherein
the content output management unit determines whether to transmit the content to the third communication unit belonging to the first group when the value of the unique identification is stored in the second storage areas as a result of the search.

8. The information-processing device according to claim 7, wherein
the content output management unit registers a pair of the second content identification and the unique identification registered to the third communication unit belonging to the first group in the second storage area and permits the content supply unit to transmit the content to the third communication unit belonging to the first group when a value of the second content identification is not stored in the second storage area.

9. The information-processing device according to claim 7, wherein
the content output management unit deletes the pair of the unique identification registered to the first communication unit belonging to the first group and the first content identification from the second storage area when the content has been transmitted completely to the first communication unit belonging to the first group through the first interface and the content is not transmitted to the other communication units belonging to the first group other than the first communication.

10. An information-processing method comprising:
transmitting content from interface to at least one of a plurality of communication units belonging to a first group through a network;
receiving unique identifications assigned to a plurality of communication units belonging to a second group through a second interface;
storing a first unique identification received through the second interface through the second interface in a first storage area, the first unique identification being assigned to a first communication unit belonging to the second group;

determining whether a unique identification received through the first interface is stored with a same value as the first unique identification in the first storage area, the unique identification being assigned to the first communication unit belonging to the first group;

transmitting the content to the first communication unit belonging to the first group via the first interface when the unique identification is stored with the same value as the first unique identification in the first storage area;

storing second unique identification received from a second communication unit belonging to the second group through the second interface in a second storage area while the content is transmitted to the first communication unit belonging to the first group through the first interface;

deleting all stored unique identifications from the first storage area when the content has been transmitted to the first communication unit belonging to the first group completely; and shifting the second unique identification from the second storage area to the first storage area.

11. An information-processing method comprising:

transmitting content from a first interface to at least one of a plurality of communication units belonging to a first group through a network; receiving unique identifications assigned to a plurality of communication units belonging to a second group through a second interface;

storing a first unique identification received through the second interface through the second interface in a first storage area, the first unique identification being assigned to a first communication unit belonging to the second group;

determining whether a unique identification received through the first interface is stored with a same value as the first unique identification in the first storage area, the unique identification being assigned to the first communication unit belonging to the first group;

transmitting the content to the first communication unit belonging to the first group via the first interface when the unique identification is stored with the same value as the first unique identification in the first storage area;

storing a pair of the unique identification registered to the first communication unit belonging to the first group and a first content identification identifying the content transmitted to the first communication unit belonging to the first group in a second storage area;

storing a value of a second unique identification received through the second interface in a third storage area while the content is transmitted to the first communication unit belonging to the first group through the first interface, the second unique identification being assigned to a second communication unit belonging to the second group;

determining whether a value of a unique identification received through the first interface is stored in at least one of the first storage area and the third storage area, the unique identification being registered to a third communication unit belonging to the first group;

searching for the unique identification registered to the third communication unit belonging to the first group by using a second content identification as a search key required by the third communication unit belonging to the first group in the second storage area when the value of the unique identification is stored in at least one of the first storage area and the third storage area; and determining whether to transmit the content to the third communication unit belonging to the first group when the value of the unique identification is stored in the second storage area as a result of the search.

12. A computer readable medium, executable on a computer, comprising:

instructions for causing the computer to transmit content from a first interface to at least one of communication unit having a first unique identification belonging to the first group through a network;

instructions for causing the computer to receive unique identifications assigned to a plurality of communication units belonging to a second group through a second interface;

instructions for causing the computer to store a first unique identification received through the second interface through the second interface in a first storage area, the unique identification being assigned to a first communication unit belonging to the first group;

instructions for causing the computer to determine whether a unique identification received through the first interface is stored with a same value as the first unique identification in the first storage area, the unique identification being assigned to the first communication unit belonging to the first group;

instructions for causing the computer to transmit the content to the first communication unit belonging to the first group via the first interface when the unique identification is stored with the same value as the first unique identification in the first storage area;

instructions for causing the computer to store a second unique identification received from a second communication unit belonging to the second group through the second interface in a second storage area while the content is transmitted to the first communication unit belonging to the first group through the first interface;

instructions for causing the computer to delete all stored unique identifications from the first storage area when the content has been transmitted to the first communication unit belonging to the first group completely; and instructions for causing the computer to shift the second unique identification from the second storage area to the first storage area.

13. A computer readable medium, executable on a computer comprising:

instructions for causing the computer to transmit content from a first interface to at least one of a plurality of communication units belonging to a first group through a network;

instructions for causing the computer to receive unique identifications assigned to a plurality of communication units belonging to a second group through a second interface;

instructions for causing the computer to store a first unique identification through the second interface in a first storage area, the first unique identification being assigned to a first communication unit belonging to the first group;

instructions for causing the computer to determine whether a unique identification received through the first interface is stored with a same value as the first unique identification in the first storage area, the unique identification being assigned to the first communication unit belonging to the first group;

instructions for causing the computer to transmit the content to the first communication unit belonging to the first group via the first interface when the unique identification is stored with the same value as the first unique identification in the first storage area;

instructions for causing the computer to store a pair of the unique identification registered to the first communication unit belonging to the first group and a first content identification identifying the content transmitted to the first communication unit belonging to the first group in a second storage area;

instructions for causing the computer to store a value of a second unique identification received through the second interface in a third storage area while the content is transmitted to the first communication unit belonging to the first group through the first interface, the second unique identification being assigned to a second communication unit belonging to the second group;

instructions for causing the computer to determine whether a value of a unique identification received through the first interface is stored in at least one of the first storage area and the third storage area, the unique identification being registered to a third communication unit belonging to the first group;

instructions for causing the computer to search for the unique identification registered to the third communication unit belonging to the first group by using a second content identification as a search key required by the third communication unit belonging to the first group in the second storage area when the value of the unique identification is stored in at least one of the first storage area and the third storage area; and instructions for the computer to determine whether to transmit the content to the third communication unit belonging to the first group when the value of the unique identification is stored in the second storage area as a result of the search.

* * * * *